United States Patent [19]

Bernasconi et al.

[11] Patent Number: 5,668,839
[45] Date of Patent: Sep. 16, 1997

[54] IF SIGNAL COMBINER FOR MINIMIZING THE BER IN A SPACE OR ANGLE DIVERSITY DIGITAL RADIO RECEIVER

[75] Inventors: Antonio Bernasconi, Seregno; Antonella Dal Lago, Paullo; Maria Pia Sirtori, Bussero, all of Italy

[73] Assignee: Siemens Telecomunicazioni S.p.A., Milan, Italy

[21] Appl. No.: 416,906

[22] PCT Filed: Oct. 8, 1993

[86] PCT No.: PCT/EP93/02758

§ 371 Date: Jun. 5, 1995

§ 102(e) Date: Jun. 5, 1995

[87] PCT Pub. No.: WO94/09573

PCT Pub. Date: Apr. 28, 1994

[30] Foreign Application Priority Data

Oct. 14, 1992 [IT] Italy .................. MI92A2347

[51] Int. Cl.⁶ .................. H04B 7/10; H04L 1/02
[52] U.S. Cl. .................. 375/347; 375/267; 455/273
[58] Field of Search .................. 375/347, 267; 455/132, 137, 138, 139, 140, 276.1, 273, 275

[56] References Cited

U.S. PATENT DOCUMENTS

| 4,261,056 | 4/1981 | Barnett et al. | 455/273 |
| 4,354,276 | 10/1982 | Karabinis | 455/276.1 |
| 4,710,975 | 12/1987 | Okamoto et al. | 455/276.1 |

Primary Examiner—Stephen Chin
Assistant Examiner—Hai H. Phan
Attorney, Agent, or Firm—Herbert L. Lerner; Laurence A. Greenberg

[57] ABSTRACT

A mixed combination strategy combiner for receivers operating in high capacity digital radio links and protected with space or angle diversity is described. The combiner comprises a system which calculates the amplitude dispersion in the spectrum of frequencies of the combined signal and a device which measures the power thereof. On the basis of this information and an appropriate calculation strategy tending to minimize the BER of the equipment, a microprocessor generates signals for gain control of the stage RF of the receivers and for phase shift control for a phase shifter for the local oscillator signal sent to one of the receivers. The calculation strategy consists of minimizing a polynomial function of the power and dispersion values. Dependence of the BER on the $f_{notch}$ characterizing the dispersion is eliminated, normalizing dispersion in relation to $f_{notch}$.

5 Claims, 7 Drawing Sheets

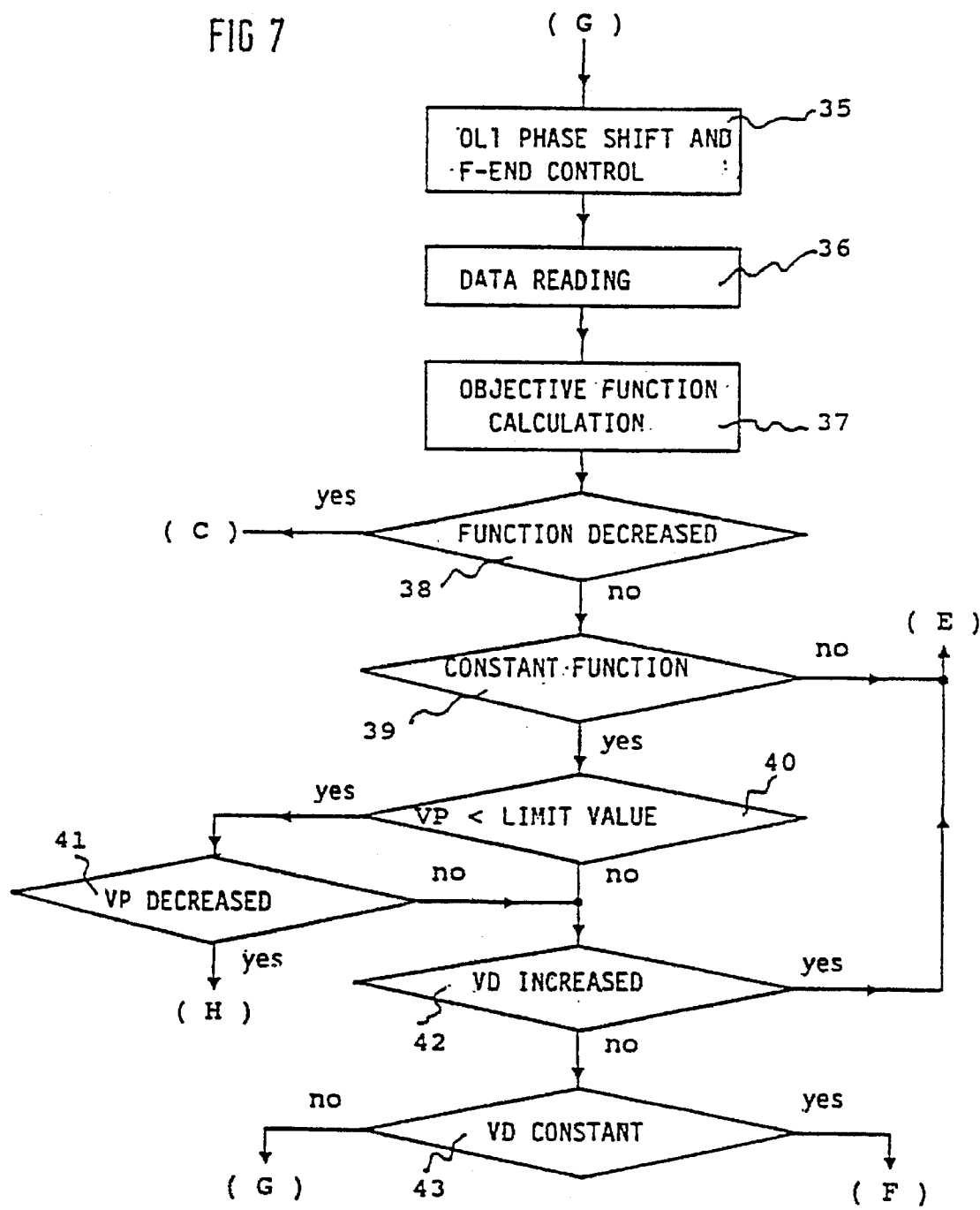

IF SIGNAL COMBINER FOR MINIMIZING THE BER IN A SPACE OR ANGLE DIVERSITY DIGITAL RADIO RECEIVER

BACKGROUND OF THE INVENTION

Field of the Invention

The present invention relates to radio receivers operating in digital radio links and protected with diversity techniques and more precisely concerns a mixed-combination-strategy combiner for receivers operating a high capacity digital radio links and protected with space or angle diversity.

As known, in a radio link connection the bean transmitted can divide into several beams which reach the receiving antenna over different paths for reasons tied to propagation. This can bring fading of the reception signal caused by the interference of the different beams on the receiving antenna. The fadings are frequently a cause of interruption of radio link connections. It is also known that the fading can be flat or dispersive. In the former case all the frequencies of the spectrum in the band of the received signal are equally attenuated. In the latter case the attenuation strikes predominantly only some zones of the spectrum, producing a distortion of the amplitude-frequency response. In reality the two types of fading can occur simultaneously.

It is useful to note that the dispersive fading is evaluated by measurements of dispersion in the band of the reception signal, where by dispersion it is meant the ratio between the maximum and minimum amplitudes of the frequency spectrum in said band. The frequency for which occurs the greatest attenuation is called notch frequency ($f_{notch}$).

In an individual receiver affected by fading, whether flat or dispersive, the error rate on the bits received, corresponding to the BER measured at the output of the demodulator, can exceed a certain threshold, so that the receiver is temporarily out of service. Therefore, in order to avoid this serious shortcoming, diversity reception techniques have been known for a long time. In cases of space or angle diversity, which more strictly concern the type of diversity to which the combiner which is the object of the present invention relates, reception equipment has been equipped with two or more receivers connected to a respective antenna or to their own feeders of said antenna. The outgoing signals from the receivers reach the inputs of a combiner which combines them appropriately to generate a single reception signal to be sent to the demodulator.

With the diversity criterion, the performance of the receiving equipment is considerably improved because the combined signal thus obtained has a much lower probability of going off-service than the individual signals received.

To implement the most appropriate combination strategy, it is essential to know theoretically and/or experimentally the transfer function of a transmitting channel affected by fading. For this purpose there have been proposed different mathematical models among which a well known model is the one proposed by Bell laboratories and known as the 'three-beam model'. Of the three beams, one is the main one which reaches the receiving antenna directly, while the other two are echoes of the main beam, i.e. beams which reach the receiving antenna by completing multiple paths of different length. The transfer function proposed for the transmission channel comprises parameters whose values are inferable from knowledge of the fading statistics for the particular section considered. Knowing the type of modulation of the transmitted signal, the fading statistics and the total transfer function of the entire transmission system, it is possible to obtain useful information on the signal characteristics at the output of the demodulator, e.g. power, amplitude dispersion, S/N, BER, etc.

This being stated, it is the job of the combiners to act on some parameters of the diversity receivers in order to optimise a preselected characteristic of the combined signal.

Depending on the optimised characteristic, it is possible, generally speaking, to group the combiners in appropriate operating categories.

A first category includes the combiners which compensate for flat fading by carrying out a phasing of the signals present on the two antennas and then adding them together in voltage to obtain the resulting signal. This strategy corresponds to the maximum summing of the resulting amplitude. It should be clarified that by phase is intended an average phase of the received signal, coinciding with the phase of an unmodulated spectral component transmitted in centreband by virtue of the symmetry of the modulation and the equal probability of all the states owing to the randomness of the modulating signal.

The combiners of this category are mainly used in small capacity radio links where, because of the modest band width, conditionings owing to the signal level prevail. It is natural that for large capacity radio links whose performance is more conditioned by the distortion of the amplitude-frequency response, combiners belonging to a second category characterised by tending to compensate for the dispersive fading are more useful.

These combiners perform an adjustment both of the level and the phase for the received signals, so as to obtain amplitude equality and phase opposition of the echoes on the two antennas. Subsequently the adjusted signals are added together to obtain a resulting signal in which the echoes are cancelled. Cancellation of the echoes leads to a flat amplitude-frequency response typically detectable with a spectrum analyser. However, in particular propagation situations, e.g. when the ratios between the main signal level and the level of the echoes have similar values on both antennas, the combiners of the second category are not efficient. Indeed, in the attempt to cancel the echoes, they also cancel a considerable part of the main signal, worsening the signal-to-noise ratio of the combined signal and causing a possible increase in the down time of the equipment.

To overcome the limitations of the previous combiners, combiners belonging to a third and a fourth category have been developed which set out to optimist the overall performance of the system while allowing for flat and dispersive fading.

Combiners of the third category are characterised by the fact that, based on the fading characteristics of the received signals, they switch from one type of operation, tending to compensate for the flat fading, to the type tending to compensate for the dispersive fading. This manner of operating however brings an excessively fast passage between the two operating zones which, as has been amply shown, can cause oscillations not tolerated by the demodulator.

Combiners belonging to the fourth category, which adopt a mixed combination strategy, also try to obviate this shortcoming in the attempt to compensate simultaneously for the flat and dispersive fading.

An example of a diversity reception system adopting said mixed combination strategy is described in Italian patent application no. 22531A/88 for Telettra, inventors Rocco Nobili, Francesco Rasà and Dario Sormani, filed 7 Nov. 1988.

Said known application claims a system for combining at least two received signals under diversity conditions involving at least two receivers, a combiner for signals coming from said receivers and a demodulator, characterised in that there is used a combiner arranged upstream of the demodulator which measures the power and dispersion of the signal combined therein and destined for the demodulator. On said signal it also makes a calculation of BER with intermediate frequency and, on the basis of the BER value thus calculated, acts in an adaptive and dynamic manner on the two signals received depending on the minimization of said BER.

The system is also characterised in that the BER is calculated with the following function based on experimentally obtained results:

$$BER=10^{\alpha P+\beta}+10\gamma^{D+\delta}$$

where P and D are the measured values of the power and dispersion of the combined signal and the parameters $\alpha$, $\beta$, $\gamma$, $\delta$ are characteristics of the modulation system employed.

The combiner used in the Telettra system is not however without shortcomings, and in particular it does not seem that it eliminates in a definitive manner the shortcoming resulting from generation of oscillations in the combined signal. The cause of this could be the excessive steepness of the exponential functions used to represent the two contributions to the BER, together with the fact of having neglected the 'mixed' term, i.e. dependant simultaneously on power and dispersion. Indeed, as better explained below, the function claimed tends to maintain the combiner in the combination state for maximum power even in the presence of a fair dispersion contribution, then passing suddenly into the combination state for the slightest dispersion when the dispersion contribution becomes excessive. This applies evidently also for the contrary behaviour. In practice, it is as though the combiner in question switched from one type of operation to the other, as happens for the third category combiners.

It can thus be inferred that the mixed combination strategy seems to be hardly effectively implemented by the Telettra combiner and the greatest gaps occur unfortunately just in the intermediate zone of the power and dispersion values where said strategy should bring the greatest benefits.

A second possible shortcoming is due to the fact that, in the presence of notch frequencies suddenly variable because of peculiar dispersive fading situations, the system could have trouble converging toward the minimum BER values, or not converge at all. Indeed, in the BER(P,D) function, there is not shown the further dependence thereof on the notch frequency values, to which refer the dispersion values D given on the abscissa of the chart in FIG. 5 of the above mentioned patent. The nature of said dependence is better explained below. The assertions concerning the second shortcoming are supported by the fact that, while in the Telettra application there is expressly stated that the algorithm used for minimization of the BER minimises the function BER(P,D) given above, nothing is said about the type of algorithm used. There are thus no elements for affirming that said algorithm can effectively minimise also a function representing the BER in a more realistic manner, i.e. which also considers its dependence on $f_{notch}$.

Accordingly, the purpose of the present invention is to overcome the above shortcomings and provide a mixed combination strategy combiner for receivers operating in high capacity digital radio links and protected with space or angle diversity.

SUMMARY OF THE INVENTION

To achieve said purpose the present invention has for its object a signal combiner for radio receivers operating in digital radio links and protected with space or angle diversity. The combiner in question acts downstream of the intermediate frequency stages of the radio receivers and upstream of the demodulator. It comprises a system which calculates the dispersion of the amplitude in the frequency spectrum of the combined signal and a circuit which measures the power in the spectrum of said signal. On the basis of this information and of an appropriate calculation strategy tending to minimise the BER at the demodulator output, a processing unit processes phase shift values, for a phase shifter which phase shifts with each other the local oscillator signals used by the receivers for conversion to intermediate frequency of the respective radio frequency signals, and commands to change the gain of the RF stage of the receivers. The calculation strategy consists of minimising an appropriate objective function of polynomial type, in which the independent variables are the values of power and amplitude dispersion of the signal at the output of the combiner. The dependence of the BEK on $f_{notch}$ which characterises the dispersion is almost completely eliminated by performing a normalisation of the dispersion values which enter into the objective function, as better described in the first claim.

The combiner of the present invention has the great advantage of making the reception equipment in which it is used considerably insensitive to the fadings of the reception signal caused by the multiple paths of the transmitted signal. The effectiveness of its operation is also especially appreciable when the two types of fading occur simultaneously and when the dispersion is characterised by notches rapidly changing within the spectrum.

Other purposes and advantages of the present invention are clarified by the detailed description given below of an example of embodiment thereof and the annexed drawings given by way of nonlimiting example:

BRIEF DESCRIPTION OF THE DRAWINGS

FIGS. 4 to 7 show the flow chart of a program controlling the operation of the combiner COMB of FIG. 1.

DESCRIPTION OF THE PREFERRED EMBODIMENT

Figure 1:
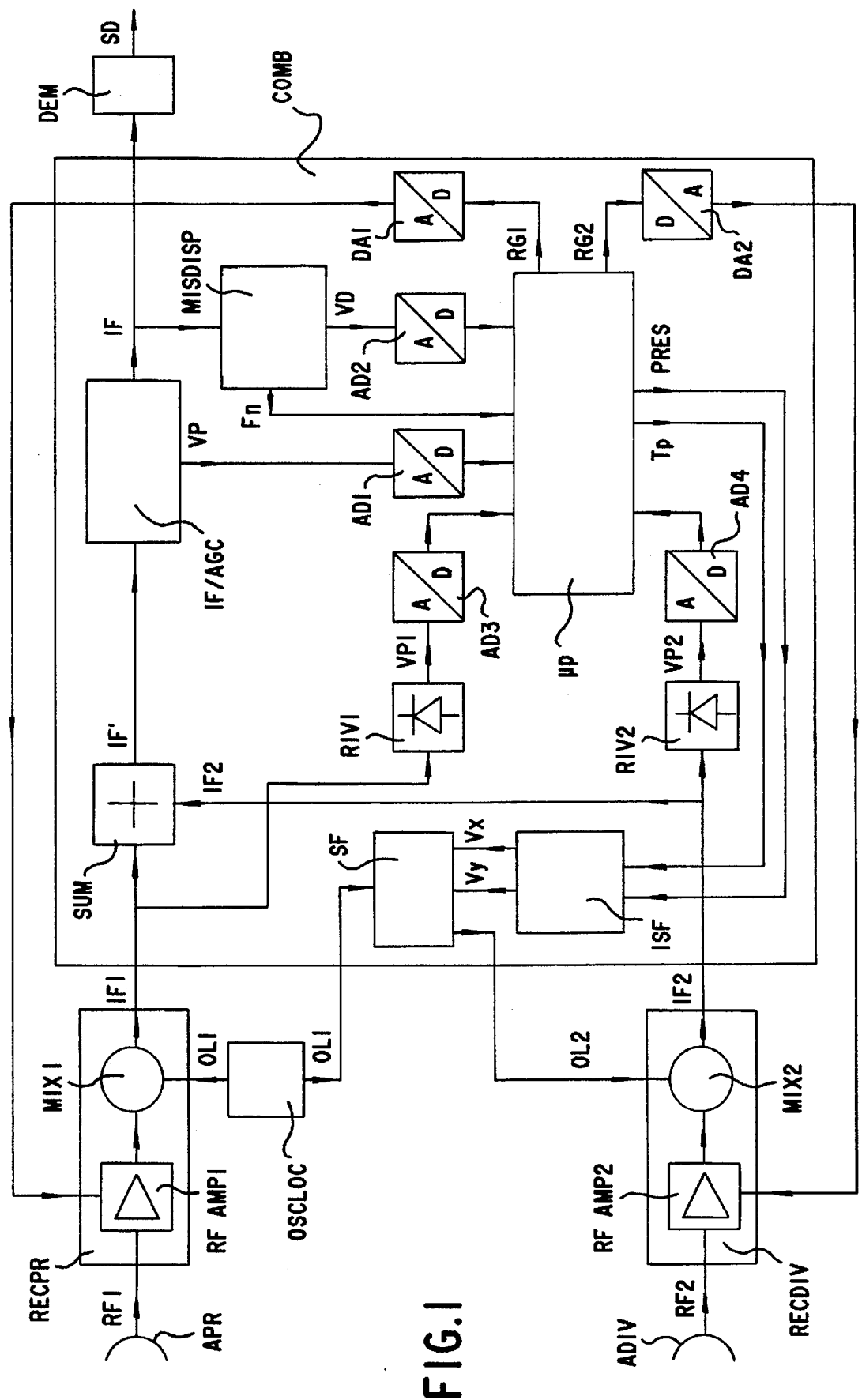
FIG. 1 shows a block diagram of reception equipment in space diversity in which the block COMB represents the signal combiner which is the object of the present invention.

With reference to FIG. 1, APR and ADIV indicate two receiving antennas belonging to space diversity radio reception equipment comprising also two receivers RECPR and RECDIV connected to the antennas APR and ADIV respectively, an oscillator OSCLOC, a signal combiner COMB and a demodulator DEM.

The signal reaching the two receiving antennas is a microwave signal consisting of a carrier modulated by a 155 Mbit signal in accordance with a 128 TCM modulation format. However the combiner COMB is capable of operating equally well with other QAM modulation formats.

The antenna APR receives a signal RF1 which reaches a variable gain radio frequency amplifier RFAMP1 constituting the input stage of the receiver RECPR. Analogously the antenna ADIV receives a signal RF2 which reaches a second variable gain radio frequency amplifier RFAMP2 constituting the input stage of the receiver RECDIV.

The outputs of the amplifiers RFAMP1 and RFAMP2 are connected to first inputs of two frequency converters MIX1 and MIX2 respectively, to whose second inputs arrive a local oscillator signal OL1 generated by OSCLOC and a signal OL2 derived from OL1 respectively by appropriate phase shifting. At the outputs of the converters MIX1 and MIX2 are present two respective signals IF1 and IF2 corresponding to the conversion of the signals RF1 and RF2 to an intermediate 70 MHz frequency.

The intermediate frequency signals IF1 and IF2 reach two distinct sum inputs of an adder SUM at whose output is present a sum signal IF' which reaches the input of an intermediate frequency amplifier IF/AGC having automatic gain control. At a first output of IF/AGC is present an amplified intermediate frequency signal IF which reaches a demodulator DEM having at its output a demodulated signal SD.

On either one of the two ways which join the outputs of the converters MIX1 and MIX2 with the respective inputs of the adder SUM is inserted a delay line, not visible in FIG. 1, consisting of a section of coaxial cable of appropriate length which equalises the absolute delay existing between the intermediate frequency signals IF1 and IF2 because of the different length of the paths which they cover to reach the inputs of the adder SUM.

The adder SUM and the amplifier IF/AGC are part of a block COMB which constitutes the signal combiner which is the object of the present invention. The combiner COMB also includes a processor UP, a dispersion measurement system MISDISP, a phase shifter circuit SF for the signal of the local oscillator OL1, an interface ISF toward said phase shifter circuit SF, four analog/digital converters AD1, AD2, AD3 and AD4, two digital/analog converters DA1 and DA2, and finally two detector circuits RIV1 and RIV2.

The amplifier IF/AGC has a second output for a signal VP which represents the appropriately amplified voltage which controls amplification of IF/AGC. Said voltage is approximately inversely proportional to the power of the signal IF' and thus represents a measurement of the power of said signal.

The network MISDISP measures the amplitude dispersion in the spectrum of the signal IF and also supplies an indication of the position of the frequency for which amplitude attenuation of IF is maximum ($f_{notch}$). Said measurements are available separately at two outputs of the system MISDISP. More precisely at a first output is present an analog signal VD which represents the dispersion value and at a second output is present a signal Fn which represents the value of $f_{notch}$.

The signals VP and VD output from IF/AGC and MISDISP reach the analog/digital converters, respectively AD1 and AD2 whose digital signals in output reach a first and a second input gate of the processor UP. The signal Fn reaches directly a third input gate of UP.

The intermediate frequency signals IF1 and IF2 reach the detectors RIV1 and RIV2 whose outputs are connected to the analog/digital converters AD3 and AD4. The digital signals issuing from AD3 and AD4 reach a respective fourth and fifth input gate of UP.

The processor UP generates at a first and a second output gate two signals RG1, RG2 which control the gain of the input stages RFAMP1 and RFAMP2 of the receivers RECPR and RECDIV. For this purpose the signals RG1 and RG2 reach the digital/analog converters DA1 and DA2 whose outputs are connected to respective gain control inputs of the radio frequency amplifiers RFAMP1 and RFAMP2. The latter control their gain in a known manner.

The phase shifter SF has a first input to which arrives the local oscillator signal OL1 which is phase shifted by SF and sent to the output as signal OL2. The direction of the phase shift of the signal OL1 is controlled by a digital signal PRES which issues from a third output gate of the processor UP and reaches a first input of the interface ISF. The magnitude of the phase shift of OL1 is determined by a timing Tp, also generated by UP and sent to a second input of ISF. The interface ISF has two outputs from which issue two isofrequential sinusoidal in-quadrature signals Vx and Vy which reach respectively a second and third input of the phase shifter SF.

The interface ISF includes an address generator for an EPROM in which are memorized samples of the signals Vx and Vy, two latch-registers in which are memorized the data read in the EPROM, two digital/analog converters connected to the outputs of said registers, two filtering and amplification circuits connected to the outputs of the digital/analog converters and a circuit which synchronizes the reading of the EPROM and conversion to analog operations.

There is now explained the operation of the combiner COMB inserted in the diversity reception equipment of which it is a part. In operation, as known, the two receiving antennas APR and ADIV are separated by a distance such that the fadings on the respective beams received are poorly correlated. The reception signals RF1 and RF2, whose characteristics are described above, are sent to the input stages RFAMP1 and RFAMP2 of the respective receivers RECPR and RECDIV of which RECPR is the main one and RECDIV the diversity one. The receivers RECPR and RECDIV are positioned downstream of their respective antennas and are connected to the feeders by a waveguide and appropriate branching filters. Because of their particular positioning, RECDR and RECDIV are also called 'front end'.

The radio frequency signal issuing from RFAMP1 is converted into the signal IF1, at the intermediate frequency of 70 MHz, by the frequency converter MIX1 which it uses for conversion of the local oscillator signal OL1. Similarly, the radio frequency signal issuing from RFAMP2 is converted into the signal IF2 at the intermediate frequency of 70 MHz by the frequency converter MIX2 which it uses for conversion of the local oscillator signal OL2. The phase shifter SF shifts the signal OL2 appropriately in relation to OL1, and this is translated into a relative phase shift between the two intermediate frequencies IF2 and IF1.

The variable gain radio frequency amplifiers RFAMP1 and RFAMP2, just as the local oscillator OSLOC and the frequency converters MIX1 and MIX2 are of known type. The phase shifter SF is also of known type and is embodied by an image rejection mixer.

The signals IF1 and IF2 are added together to obtain the combined signal IF', whose power lever is amplified and stabilised by the intermediate frequency amplifier IF/AGC which is also of known type. The combined signal IF issuing from IF/AGC is demodulated by the demodulator DEM to obtain the starting digital signal. In view of this, it is useful to note that the combination operation does not consist of merely summing IF1 with IF2, because a basic role is played by the strategy according to which the levels of the signals IF1 and IF2 are controlled. The adjustments must be such that they eliminate or minimise any type of fading in the combined signal IF. For the combiner in question the control strategy consists principally of the acquisition by the processor UP of the signals VP1, VP2, VP, VD and Fn and an appropriate processing thereof in order to generate in output the control signals RG1, RG2, Tp and PRES.

Figure 2:
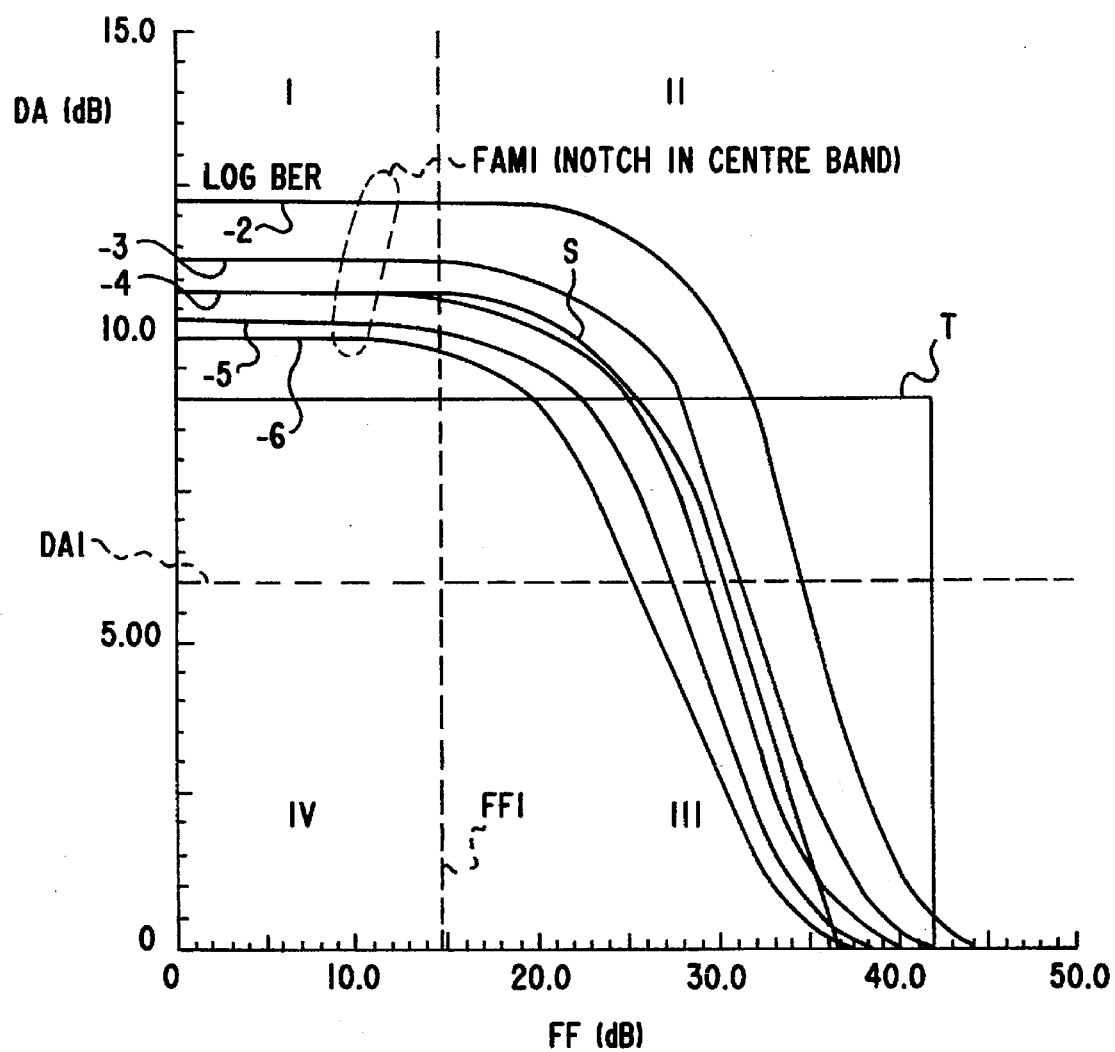
FIG. 2 shows the BER curves of reception equipment provided in accordance with the known art and a BER curve of the equipment of FIG. 1.
Figure 3:
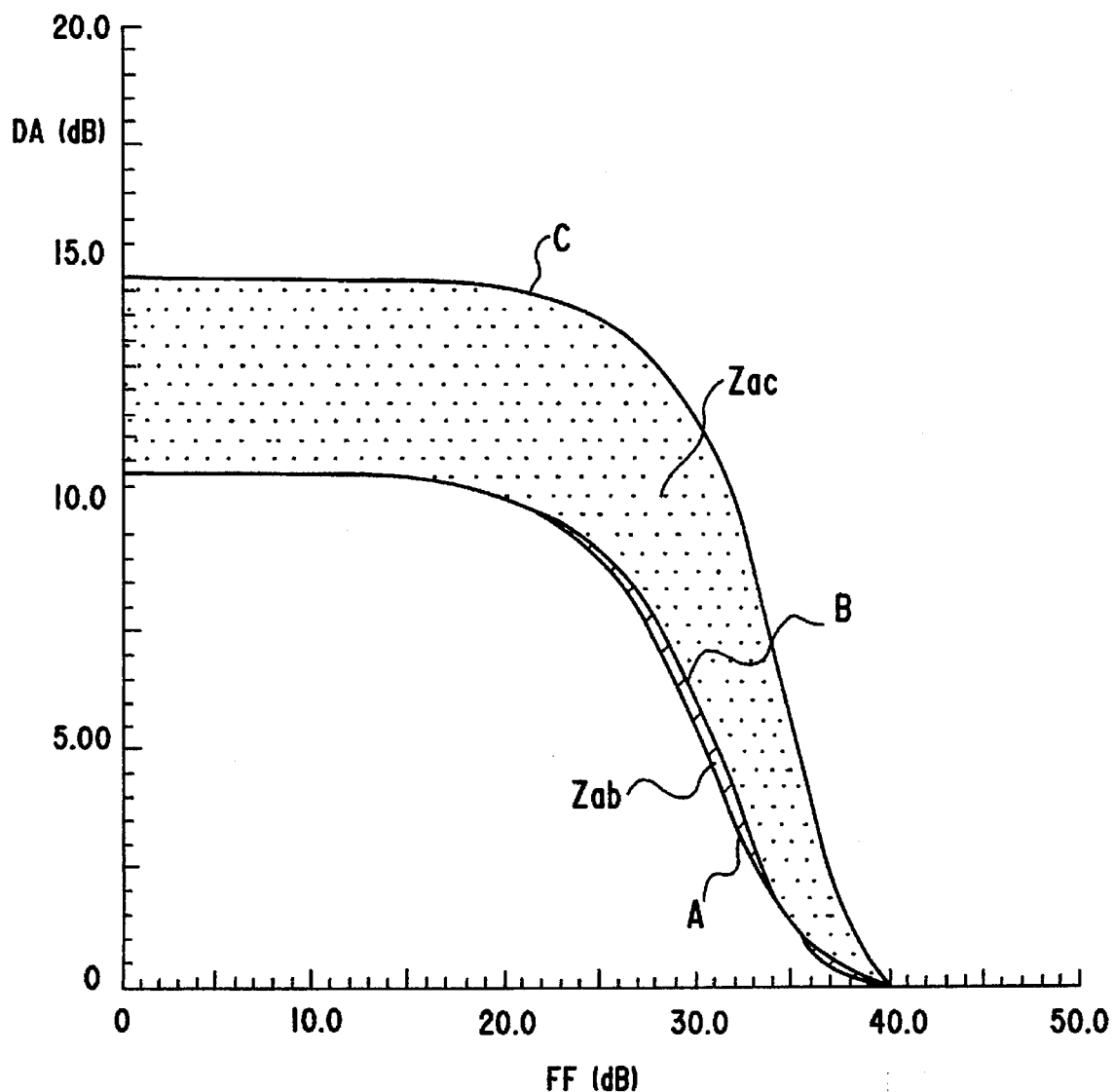
FIG. 3 shows other BER curves similar to those of FIG. 2.
Figure 4:
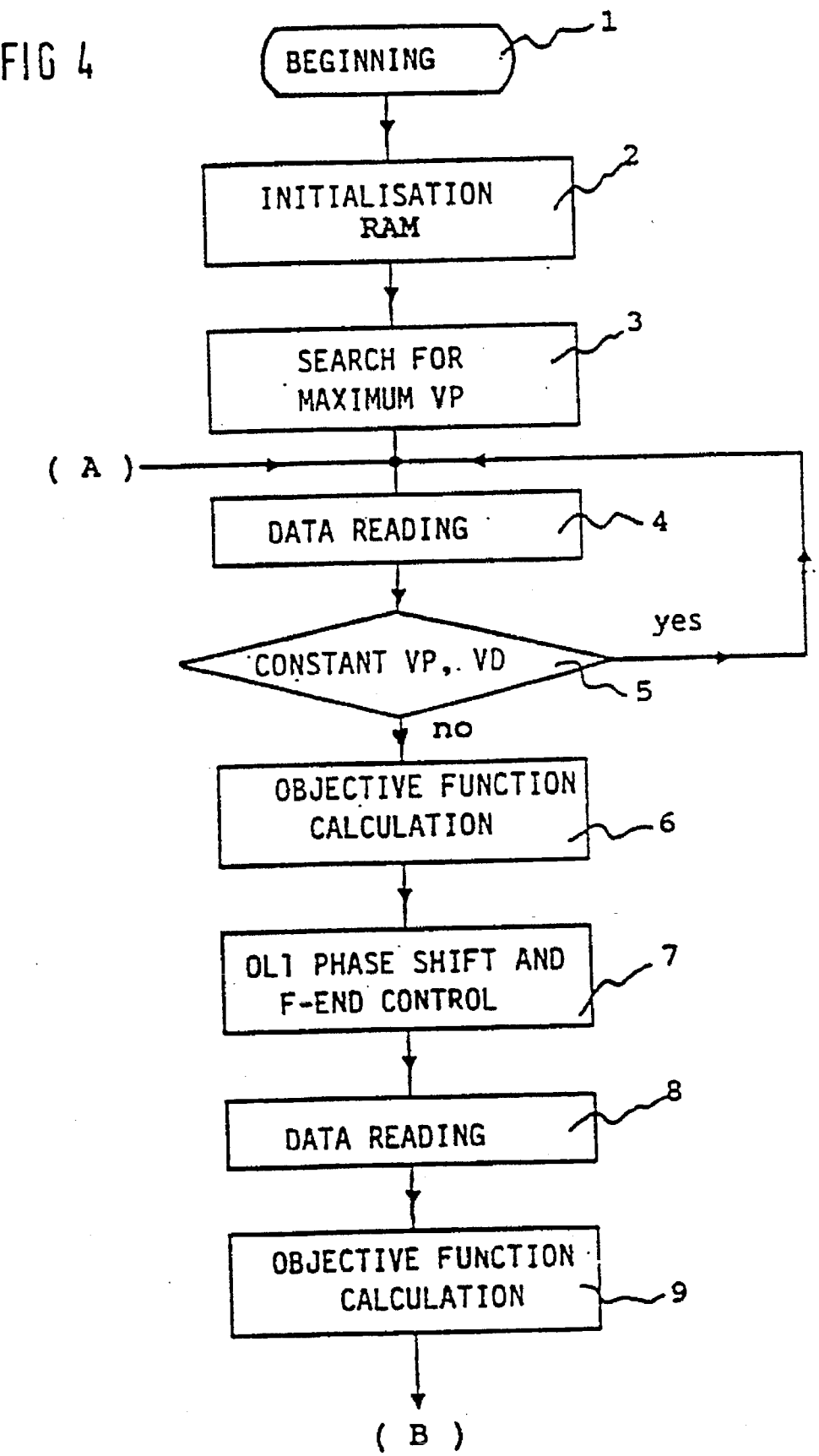
Figure 5:
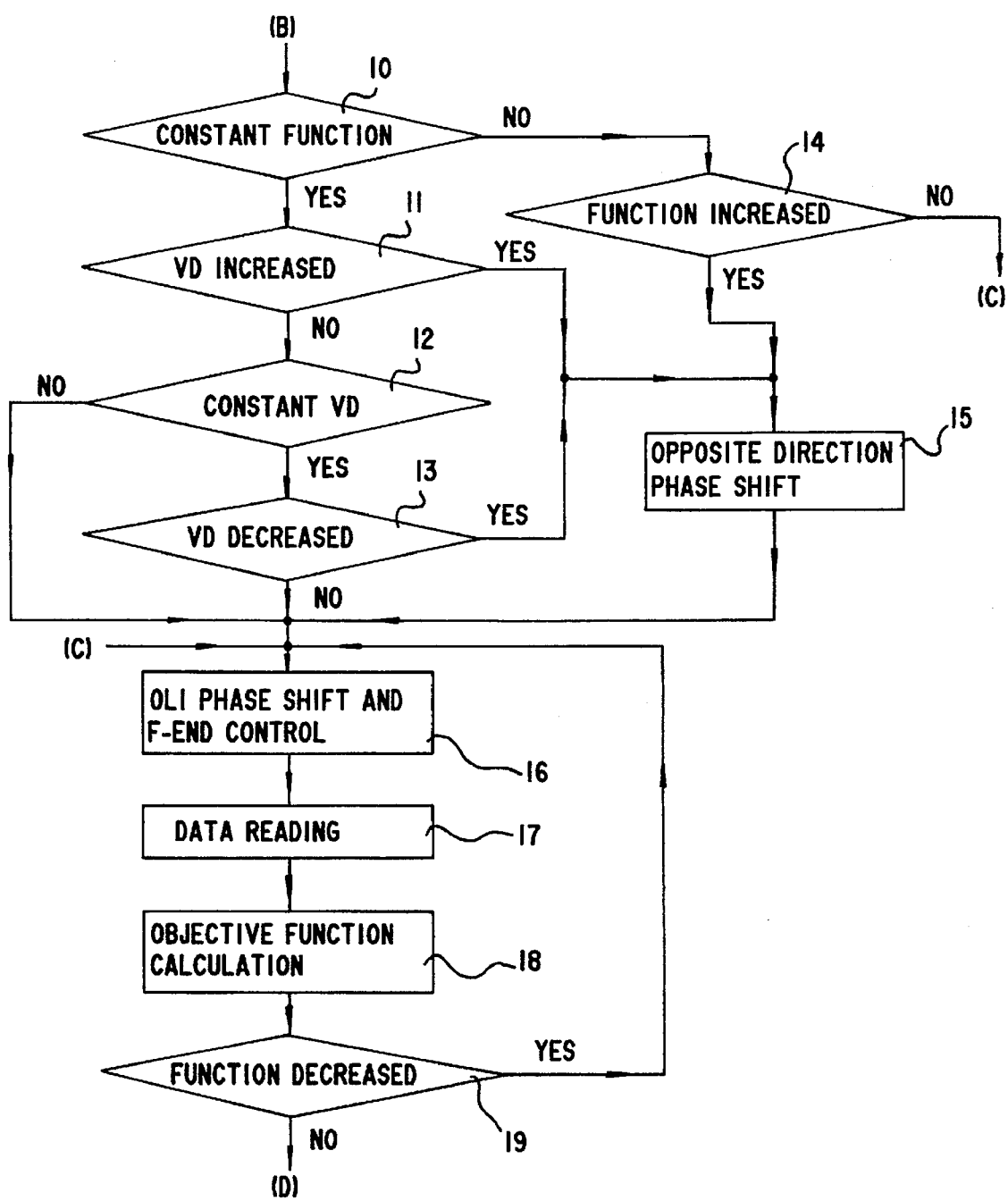
Figure 6:
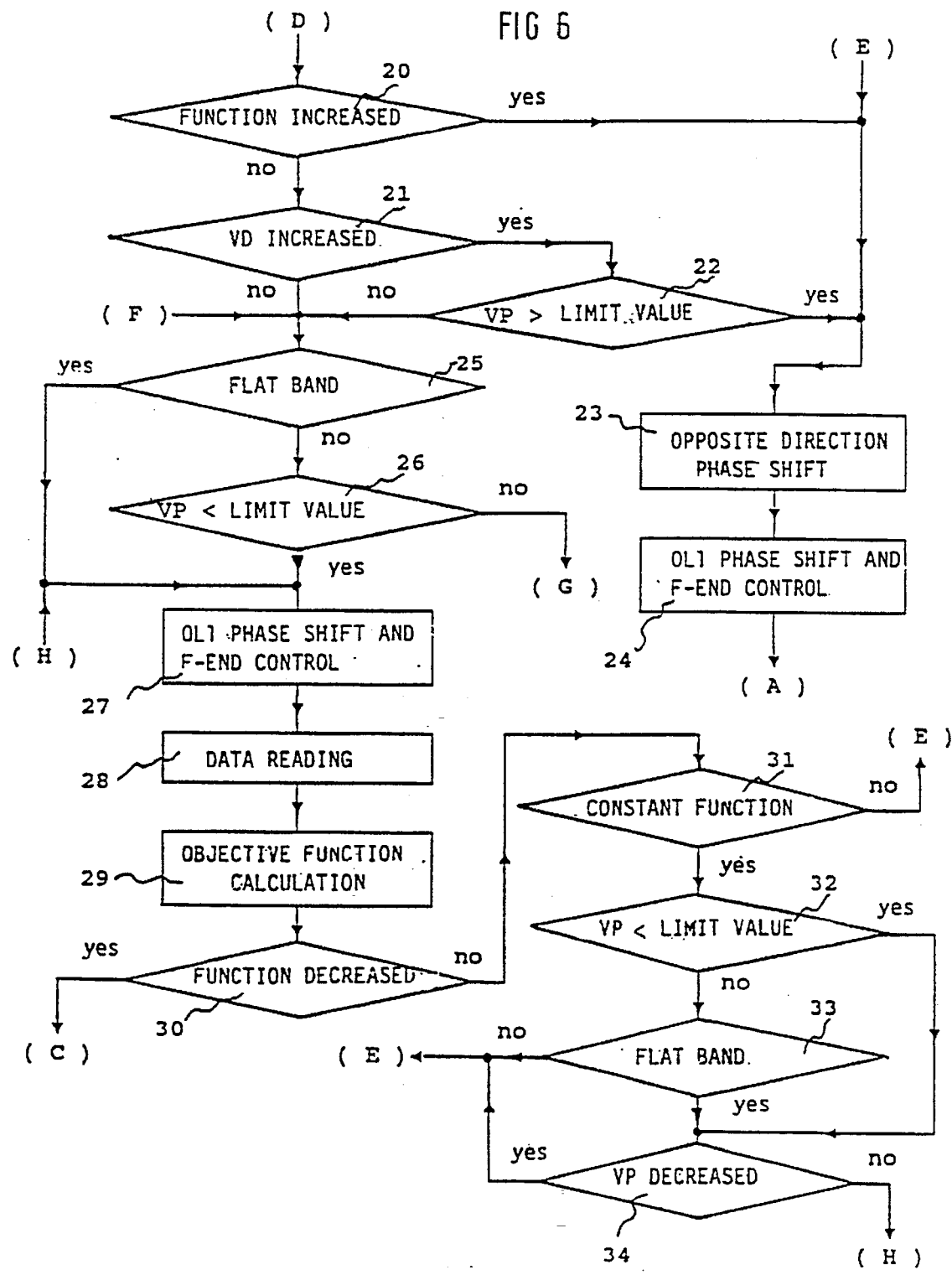

The above control strategy relates to the mixed combination "philosophy" and, as explained for FIGS. 2 and 3, consists essentially of minimising an appropriate objective function of the independent variables VP, VD and Fn. The behaviour of the objective function approximates that of a family of curves representing constant BER values, measured at the output of the demodulator DEM, having VP, VD and Fn as parameters. The block UP of the example is provided in a nonlimiting manner by the INTEL microprocessor 80C31.

The signals VP1, VP2, VP, VD and Fn which reach UP come from measurements made on the intermediate frequency signals IF1, IF2, IF' and IF. More precisely, the signals VP1 and VP2 indicate the power of the individual signals IF1 and IF2 and hence, keeping into account the known amplifications or attenuations introduced by RFAMP1 and RFAMP2, that of the reception signals RF1, RF2. Said powers are obtained by detection and filtering operations of IF1 and IF2 completed by the respective blocks RIV1 and RIV2, which include detection circuits of known type. The signal VP represents the power of the combined signal IF' measured immediately after the output of the adder SUM. The measurement of VP is made in a known manner by the automatic gain control circuit (AGC) included in the amplifier IF/AGC and in practice the voltage of AGC is used. It should be noted that, because of the mixed combining strategy implemented by the combiner COMB, the voltage VP might not represent the sum of the powers of the signals IF1 and IF2. Indeed, the sum signal IF' is affected by the phase shift between IF1 and IF2 introduced by the phase shifter SF.

The signals VD and Fn issuing from the measurement system MISDISP represent the amplitude dispersion in the spectrum of the signal IF and the notch frequency which characterises said dispersion respectively. The processor UP calculates the relative position of $f_{notch}$ in the IF spectrum performing the relationship $Fn'=Fn/f_{symbol}$, because $f_{symbol}$ coincides with the known value of the band width B of the signal IF. For example, if $f_{notch}$ falls in the centre of band B, then Fn'=0. But if $f_{notch}$ falls at the ends of the band, then Fn'=0.5 because the band ends are characterised by the values of $\pm f_{symbol}/2$.

The circuitry embodiment of the system MISDISP is already known to those skilled in the art and its description is therefore not considered necessary. It is however useful to note an innovative example of an embodiment of said system recently implemented in the laboratories of the applicant. For this embodiment, there was filed in the name of Siemens Telecomunicazioni, an Italian patent application No. MI92A 002341, dated 12 Oct. 1992, entitled 'Device for calculating the amplitude dispersion of the spectrum of a modulated signal' in which are designated the same inventors as for the present invention.

As concerns the control signals RG1, RG2, Tp and PRES generated by the processor UP, it should be first noted that the characteristics of the signals Tp and PRES depend on how the phase shifter SF acts to phase shift the signal OL1, while for the digital signals RG1 and RG2 there is nothing to add to that which had already been stated.

A phase shifter which uses an image rejection mixer must necessarily have an input for the local oscillator signal OL1, to be phase shifted, and two inputs for two isofrequential sinusoidal signals mutually phase shifted 90°, as are the signals Vx and Vy. That stated, representing by $f_1$ the frequency of OL1, $f_m$ the frequency of Vx and Vy, and $f_2$ the frequency of the output signal OL2, will be $f_2=f_1\pm f_m$, where the sign + or − depends on the fact that Vx and Vy are mutually phase shifted +90° or −90°. The difference $|f_m|$ between the frequencies $f_1$ and $f_2$ produces an absolute phase shift value between the input and output of the phase shifter which increases constantly in time. Indeed, the phase shift expression is $|2\pi f_m t|$. Of course if $f_2>f_1$, the signal OL2 anticipates OL1 and vice versa in the contrary case. The phase shifting process continues until the value established by the processor to compensate for the fading is reached, after which it is stopped and the phase shift remains at the value reached. Phase shifting is stopped merely by stopping the generation of Vx and Vy.

In view of the foregoing, the interface ISF must generate the two sinusoids Vx and Vy only during predetermined time intervals and must also be able to interchange the signals Vx and Vy on the two outputs to reverse the direction of the phase shift. For the first purpose it makes use of the signal Tp, while for the second purpose it makes use of the signal PRES. When the signal Tp is high, generation of Vx and Vy is enabled but when it is low at the outputs of Vx and Vy, there is present a constant value corresponding to that of the respective values existing upon disabling. The signal PRES is a bit written by UP in a special output register.

The address generator belonging to the interface ISF consists of a two way counter timed by an oscillator signal coming from the internal timing circuit. At each increase of the counter there is performed a first reading of the EPROM and the first word read is memorized in a first latch. Immediately afterward but before the new increase of the counter, the logical value of the last address bit of the EPROM is negated in order to perform a second reading in another memory zone of a second word which is memorized in a second latch. The sequence of the first words read constitutes the temporal succession of samples of the sinusoid Vx, while the sequence of the second words constitutes that of Vy.

The signal Tp reaches the counting enablement input of said two way counter, enabling or disabling reading of the EPROM and hence generation of Vx and Vy. The signal PRES reaches the input pin of the counter which determines the direction of counting forward or backward. It can be easily shown that by reversing the direction of reading of the EPROM the sinusoids Vx and Vy are interchanged on the outputs and the direction of the phase shift is also reversed.

The phase shifter SF of the example is capable of producing a phase rotation of the signal OL1 with a rate of 6000 degrees per second, obtained with a frequency $f_m$ of the sinusoids Vx and Vy of approximately 16.6 Hz. The combiner COMB is able to follow flat fadings characterised by attenuation speeds which can reach even 1000 dB/sec and dispersive fadings characterised by notches which move through the band of IF at a speed which can reach 300 MHz/sec. The only limitation to the speed of the combiner is due to the time constant of the AGC included in the amplifier IF/AGC.

With reference to FIG. 2 there is noted a chart in which on the abscissa are shown the flat fading values FF and on the ordinates those of dispersive fading DA. The values of FF and DA are expressed in dB and are calculated by UP by means of the expressions: DA=20 logVD; FF=20 log ($VP_{max}$/VP) where $VP_{max}$ is the maximum value taken by the voltage VP during an appropriate period of observation under nominal propagation conditions.

The chart shows a family of curves FAM1 and two curves identified by S and T not belonging to FAM1. The family FAM1 represents the function logBER(FF,DA)=constant. The BER is that measurable at the output of the demodulator of a generic digital receiver, not necessarily in diversity, to which arrives a modulated signal QAM transmitted on a path affected by flat and dispersive fading. For each curve of the family is indicated the value of the constant, i.e. of the parameter logBER, for which the curve was plotted. The family FAM1 can also be interpreted as a group of level curves of a surface represented by the function logBER(FF, DA) traced in three-dimensional Cartesian space. In this case the distance between the level curves gives an indication of the steepness of the function.

Two lines: $FF=FF_1$ and $DA=DA_1$ divide the Cartesian plane of the variables FF and DA in four zones, i.e. identified by I, II, III and IV respectively for the purposes explained below.

The family FAM1 gives a very explanatory and at the same time concise indication of how the performance of a generic receiver can be influenced by the fadings which unavoidably appear on the section. Said family is the result of a computer simulation but can be inferred by appropriate mathematical manipulation of known curves or can be obtained directly by experimentation.

The curves identified by S in said figure represents the function logBER(FF,DA)=constant, evaluated at the output of the demodulator of the reception system of FIG. 1. The curve S was obtained by computer simulation of a diversity system comprising the complete circuitry diagram of FIG. 1. In the simulation the signals are combined in accordance with the polynomial formula set forth below. In the calculations were introduced the values of logBER=−4 and $f_{notch}/f_{symbol}=0$.

The curve indicated by T represents the function logBER (FF,DA)=constant evaluated at the output of the demodulator of the reception system described in the Telettra patent application mentioned above. The curve T was obtained by computer simulation of a diversity system comprising the complete the complete circuitry diagram proposed by Telettra in which the combiner operates in accordance with the related exponential formula. For a correct comparison with the curve S, in the calculations was used the same value of logBER=−4.

The chart of FIG. 2 is however not complete. Indeed, in the calculations which lead to the plotting of the family FAM1 the values of the dispersive fading DA, indicated on the ordinate, are for a notch which falls in centre band ($Fn'=f_{notch}/f_{symbol}=0$). These values can however be obtained with notches falling in different positions within the band, influencing differently the BER. More complete information therefore requires introduction of Fn' into the calculation as the second parameter which allows for the relative position of the notch used to simulate the dispersion. The computer simulations in which this further dependence is taken in due consideration lead to plotting of new curve families, a family for each new value of Fn', but which for the sake of simplicity are not shown in additional figures. The new curve families are all similar in form to FAM1 but are gradually translated upward with the increase in the values of Fn'. The maximum translation is on average approximately 3 dB and is found for Fn'=0.5, i.e. when the notch falls at the band ends. In addition, again with the increase in the values of the second parameter Fn', the individual curves inside each family are more widely spaced. The explanation of this behaviour is that when the notch moves to the band ends the system becomes less sensitive to dispersive fading.

From the totality of all the above considerations it can thus be concluded that the BER of a receiver to which arrives a signal affected by fading is well represented by a family of curves for each value of $f_{notch}$.

The utility of this representation becomes more understandable below, i.e. when the problem of determining the shape of the mathematical function which implements the better mixed-combination strategy is used and furthermore each time it is useful to take advantage of a 'visual' representation of how the combiner COMB acts in minimising the BER at the output of the demodulator DEM.

With reference to FIG. 3 there are noted three curves indicated by A, B and C respectively in the Cartesian plane of the variables FF, DA. The curve A corresponds to the curve of FIG. 2 belonging to the family FAM1 identified by the value of logBER=−4 and Fn'=0. The curve C corresponds to a curve, not shown in FIG. 2, having the same value of logBER for curve A but belonging to a family identified by the value Fn'=0.5. Between the curve A and the curve C are included infinite curves corresponding to the values of Fn' variable with continuity from 0 to 0.5. The area between curves A and C indicated by $Z_{ac}$ shows the dependence of the family of curves on the parameter Fn'. The curve indicated by B represents the new position of the curve C after appropriate normalisation of the values of the variable DA, performed with the purpose of reducing the dependence of C on the parameter Fn'. The area between the curves A and B indicated by $Z_{ab}$ shows the residual dependence of curve A on the parameter Fn' after normalisation. As may be seen in the figure, normalisation of the variable DA achieves very well its purpose and indeed the area $Z_{ab}$ is considerable less than the area $Z_{ac}$. Using DA* to indicate the normalised value of DA, the formula applied for said normalisation is as follows:

$$DA^* = (k \times DA^2) + (DA \times h) \qquad (1)$$

with k=0.0518×Fn'/2 and h=−0.043×Fn'/2, taken experimentally and depending on the type of modulation.

Application of the formula (1) leads back all the possible curve families to a single family characterised by the function logBER(FF,DA*)=constant.

For the following remarks, which are preliminary to determination of the objective function, it is useful to refer to FIGS. 2 and 3. Examining the family FAM1 it can be noted that by varying the parameter logBER, the individual curves pass progressively and without break from one to the other. The same applied for the dependence of the entire families of curves of the parameter Fn'. This behaviour is explained by the fact that the function logBER(FF,DA) in the field where it has practical significance, is continuous and monotonically growing with the growth of the values of the variables FF, DA and the parameter Fn'. In addition, the charting of the family FAM1 shows a very similar trend between the different curves, which can be better investigated by examining the curves in the individual zones I, II, III and IV.

Zone I is characterised by low flat fading values FF and by high dispersive fading values DA and in this zone the curves have a trend almost parallel to the axis of the abscissa. Therefore the BER is dependant mainly on the dispersive fading.

Zone II is characterised by intermediate values of the variables FF and DA and in this zone the BER is strongly influenced by both fading types.

Zone III is characterised by low values of dispersive fading DA and high flat fading values FF and in this zone the curves have a slightly sloped trend compared with the axis of the ordinates but the BER depends mainly on the flat fading FF.

Zone IV is characterised by low values of both flat fading FF and dispersive fading DA and in this zone the BER remains almost constant and close to minimum values.

From the foregoing the meaning of the terms $FF_1$ an $DA_1$ is clear. More specifically, the former corresponds to a value of FF above which the flat fading must be taken into consideration. The latter corresponds to a value of DA above which dispersive fading must be taken into consideration.

The above remarks concerning the zones I, II, III and IV and the terms $FF_1$ and $DA_1$ apply naturally also in the reference to the normalised family logBER(FF,DA*)= constant, not represented in the figures, but whose charting is similar to that of FAM1. For the above said family the reference to FIG. 2 continues to apply also.

With the intention of applying the best mixed combination strategy, the way followed was to select an objective function of the polynomial type in the variables FF and DA* capable of approximating as well as possible the average trend of the curves of FAM1. This choice brings an immediate advantage due to the fact that the polynomial function is simple and easy to manage with the calculations. A second advantage is that minimization of the BER is faster and more effective, thanks to the particular trend preselected for the polynomial function. Indeed, said trend reproduces well the reaction of the receiver to an objective physical reality, i.e. that in which the fadings are never either only of the flat type or only of the dispersive type. This stated, the objective function calculated by the processor UP is as follows:

$$OB(FF,DA^*)=OB1(FF)+OB2(DA^*) \qquad (2)$$

where:

(3) $OB1(FF)=(FF-a)^2$ for $FF>FF_1$ and $DA^*>DA_1^*$;
(4) $OB1(FF)=(FF+b)$ for $DA^* \leq DA_1^*$;
(5) $OB2(DA^*)=c(DA^*-d)^2$ for $DA^*>DA_1^*$;
(6) $OB2(DA^*)=(mDA^*+q)$ for $DA^* \leq DA_1^*$ and $FF \geq FF_1$.

In expressions 3 and 4 the term $FF_1$ is that indicated in FIG. 2. In 5 and 6 the term $DA_1^*$ has a value approximately equal to the term $DA_1$ of said figure.

Functions 2 to 6 are given as a nonlimiting example of a possible objective function of polynomial form: a more refined approximation of the family FAM1 could require addition of additional terms of a higher degree. The values of the coefficients a÷d,m and q, depending on the type of modulation, are calculated to obtain the best possible approximation of the curve S of FIG. 2.

The objective function 2, according to the values of the variables FF and DA*, generates a family of objective curves appropriately spaced from each other and all similar in form to the single curve S shown in FIG. 2.

The family of objective curves has no dependence on the parameter Fn' because the polynomial function is calculated using the normalised dispersion variable DA*. It follows that thanks to the similarity of FAM1 to the family of objective functions, the objective function minimization process leads also to minimization of the function logBER (FF,DA*) and hence of the BER at the output of the demodulator DEM.

FIG. 2 gives a visual aid useful in understanding the operation of minimization of the BER, which consists indeed of searching for the shortest path to unite two curves starting from any point on a generic curve to reach an immediately underlying curve. Examining in particular the minimization process in zone II, in which the variables representing the two types of fading take on intermediate values, it is noted that the curves of type S of the objective family have a curvature such that, during the search for the minimum, the two types of fading are both adequately considered.

Therefore this zone, which is more critical for the known combiners, is not critical at all for the combiner COMB, which always acts in accordance with an effective mixed combination strategy. The same cannot be said for the Telettra combiner, which acts on the basis of a family of curves similar to curve T, which in zone II shows a sharp change of slope.

Of course, when the minimum BER falls in zone II, it does not correspond to a situation of maximum power nor to a situation of minimum dispersion. It corresponds rather to an optimised combination of the two situations.

FIGS. 4 to 7 show the flow chart of a program implemented by the microprocessor INTEL 80C31 which constitutes the processing block UP. The program controls the combiner COMB and the reception equipment of FIG. 1 of which the combiner is a part. The program structure does not at all reflect that of programs which use known algorithms for seeking the minimum of a function. It is much more articulated and more in harmony with the implementation of a minimum search strategy performed by trial and combining appropriately terms whose values change in an un foreseeable manner. Said strategy consists mainly of introducing appropriate perturbations in some physical parameters of the receivers and evaluating the impact thereof on the objective function values and those of flat and dispersive attenuation measured individually and modifying adaptively the number and/or intensity of said disturbances until reaching an optimal flat or dispersive attenuation condition such that the objective function does not diminish further.

The above remarks are further clarified by the explanation of the flow chart wherein:

in steps 1 and 2 are carried out some operations of initialization of the RAM and some internal registers of the microprocessor, called also hereinafter unit, concerning the frequency $f_{symbol}$, the constants $FF_1$ and $DA_1$ which delimit the four zones, the coefficients k and h, of the expression used for normalisation and finally the coefficients a÷d, m and q, of the objective function.

In the next step 3 the unit seeks the maximum value $VP_{max}$ of the signal VP which it then uses to calculate the variable FF;

in step 4 the unit reads the input data, i.e. the numerical values corresponding to the input signals VP1, VP2, VP, VD and Fn;

in step 5 there is carried out a test on VP and VD; if the values read remain constant, the program goes back to the preceding step 4, otherwise it continues in step 6 wherein it calculates the values of the variables FF, DA, Fn', DA* and then the objective function OB(FF,DA*);

in step 7 the unit generates appropriate values of the output signals Tp, PRES, RG1 and RG2. The signals Tp and PRES command a predetermined phase shift of the signal OL1. The signals RG1 and RG2 activate gain control of the front-end amplifiers (F-END) RFAMP1 and RFAMP2. Said control is done for two reasons: first, to avoid saturation of the front-end amplifiers when the level of the signals received is too high, and second, to activate the best mixed combination strategy during minimization of the objective function. For this purpose, if the dispersion VD is very low, the signals RG1 and RG2 are such as to avoid the saturation of RFAMP1 and RFAMP2. But if the dispersion VD is detected, only the gain of the amplifier which receives the most attenuated signal is increased. This allows better cancellation of the echoes which is done after acting only on the step of OL1. The program then performs steps 8 and 9 which are similar to steps 4 and 6. Steps 7, 8 and 9 are repeated several times during the program because they are attempts made by the unit to minimise the BER of the equipment.

The next step 10 is a test if the value of the objective function is constant: if it is, there is calculated in step 11 a test of the value of the dispersion VD to determine if at the same time it has increased. If VD has not increased, in step 12 the test on VD is repeated to determine if it has remained constant or has decreased. If VD has remained constant, in step 13 a test on the power VP of the combined signal is completed to determine if it has decreased: if VP has not decreased, a sequence including three steps 16, 17 and 18 initiates, starting from a point C, exactly like the three steps 7, 8 and 9. If from the tests on VD completed in steps 11 and 12 the dispersion has decreased, the program goes from step 12 directly to point (C), skipping step 13.

Returning to the test of step 10, if the objective function has not remained constant, there is completed in step 14 another test of the value of said function. If the latter has decreased, the program returns to point (C), and if the objective function has increased step 15 is performed in which the unit generates a command which presets the phase shifter SF to reverse the sign of the phase shifting of the signal OL1, after which the program continues at point (C). The program performs step 15 even in those cases in which, in step 11, VD has increased, and, in step 13, VP is constant or has decreased.

After performance of phases 16, 17 and 18, the program completes in step 19 a test of the value of the objective function to see if it has decreased. If it has, the program goes back to point (C), but otherwise goes to step 20 where the test on the objective function is repeated to determine if it has remained constant or increased.

If the tests of steps 19 and 20 show that the objective function has increased, the program returns to point (E). If the function has remained constant, there is completed in step 21 a test on the dispersion VD. If VD has increased, in step 22 a test of the power VP is performed namely if VP is greater than an upper limit, such that the flat fading FF is less than the value $FF_1$. In practice, it is tested if the combiner is working in zone I or IV of FIG. 2. If it is, the program proceeds to point (E) and thence to performance of steps 23 and 24, which are exactly like steps 15 and 7, after which there is a jump to point (A) in the initial part of the program. If in step 22, VP is less than or equal to the above upper limit, it means that the combiner is working in zone II or III of FIG. 2, and there is then a jump to point (F), which precedes performance in step 25 of a test of the dispersion VD.

If the test performed in step 21 showed that the dispersion VD had not increased, the program went directly to step 25, skipping steps 22, 23 and 24. In step 25 it is asked if VD is less than a value such that DA is less than the value $DA_1$. In practice it is tested if the combiner is working in zone III or IV of FIG. 2. If not, it means that the combiner is working in zone I or II of FIG. 2, and in this case, in step 26, there is completed a test of the power VP to see if the combiner is working in zone I or II of FIG. 2. If it is working in zone I, the program skips to point (G), but if the combiner is in zone II, the program performs a sequence of three steps 27, 28 and 29 which are exactly like 7, 8 and 9 and whose beginning is marked by a point (H). If the test of step 25 shows that the combiner was working in zone III or IV of FIG. 2, the program went directly to performance of the sequence of steps 27, 28 and 29, skipping step 26.

At the end of step 29 the program enters step 30 in which a test of the value of the objective function is performed: if the function has decreased, there is a jump to point (C), and otherwise in the next phase 31 there is performed another test to see if the function has increased or remained constant. In the former case there is a jump to point (E), while in the second case the program performs, in step 32, a test on VP exactly like that performed in step 26.

If the test of step 32 shows that the combiner is working in zone I or IV of FIG. 2, the program goes into step 33 in which a test on VD is completed exactly like that of step 25. If the additional test of step 33 shows that the combiner is working in zone I of FIG. 2, there is a jump to point (E), and otherwise it means that the combiner is in zone IV of FIG. 2: in this case the program goes to step 34. If the test of step 32 showed that the combiner was working in zone II or III of FIG. 2, the program went directly to step 34, skipping step 33.

In step 34 a test on the power value VP is completed: if it has decreased, there is a jump to point (E), and otherwise there is a jump to point (H).

If the two tests completed in steps 25 and 26 showed that the combiner was working in zone I of FIG. 2, the step 26 returned to point (G) in which the program performs the sequence of steps 35, 36 and 37, which are exactly like 7, 8 and 9, and then goes into step 38.

Step 38 is a test of the value of the objective function: if this is decreased, there is a jump to point (C) at the beginning of the program, but otherwise the program goes to step 39 where there is completed another test to determine if the objective function has remained constant or has increased. In the former case a jump to point (E) is performed, but otherwise the program goes to step 40 in which a test on the power VP is completed, like the test completed in steps 26 and 32;

if the test of step 40 shows that the combiner is now working in zone II or III of FIG. 2, in step 41 another test on the power VP is performed to determine if it has decreased; if step 40 shows that the combiner is working in zone I or IV of FIG. 2, the program goes directly from step 40 to step 42, skipping step 41; but if step 41 is performed and shows that VP has decreased, there is a jump to point (H) but otherwise step 42 is performed in this case also.

Step 42 is a test on the dispersion VD to determine if it has increased: if it has, there is a jump to point (E). Otherwise the program goes into step 43 where there is performed another test on the dispersion VD, to determine if it has remained constant or decreased: in the former case there is a jump to point (F), while in the latter case there is a jump to point (G).

The detailed description of the flow chart of the program together with the information available in the programming and operating manuals of the microprocessor indicated or of an equivalent one allow a person skilled in the art, particularly expert in the use of microprocessors, the embodiment of the combiner which is the object of the present invention.

We claim:

1. In a digital radio signal receiver operating in digital radio links and protected with space or angle diversity, the digital radio signal receiver having two radio receivers and a demodulator providing a demodulated output signal, a signal combiner connected between the two radio receivers and the demodulator, the signal combiner comprising:

an adder for summing intermediate frequency signals issuing from the radio receivers and forming a combined signal having a residual power attenuation and a residual amplitude dispersion due to propagation conditions;

a network connected to said adder for measuring the residual amplitude dispersion and a relative position of a notch frequency, whereby the notch frequency is defined such that a residual amplitude attenuation in a spectrum of the combined signal is a maximum;

a measuring device connected to said adder for measuring the residual power attenuation;

a digital signal processor connected to said measuring device and receiving measurement results therefrom, said digital signal processor generating control signals setting an amplitude and a mutual phase shift of the intermediate frequency signals, and said digital signal processor adaptively perturbing the control signals for minimizing a bit error rate BER in the output signal of the demodulator, by minimizing a polynomial function of a normalized residual amplitude dispersion and of the residual power attenuation, the polynomial function approximating a parametric logarithmic representation of the bit error rate BER also being a function of the normalized residual amplitude dispersion and of the residual power attenuation, wherein constant BER values are taken as many values of a parameter of said parametric representation, and said digital signal processor normalizing the residual amplitude dispersion with respect to the relative position of the notch frequency and reducing a further dependency of the representation of the BER on the relative position of the notch frequency.

2. The signal combiner according to claim 1, wherein the polynomial function is: $OB(FF,DA^*)=OB1(FF)+OB2(DA^*)$, where:

$OB1(FF)=(FF-a)^2$ for $FF>FF_1$ and $DA^*>DA_1^*$ $OB1(FF)=(FF+b)$ for $DA^*\leq DA_1^*$ $OB2(DA^*)=c(DA^*-d)^2$ for $DA^*>DA_1^*$ $OB2(DA^*)=mDA^*+q$ for $DA^*\leq DA_1^*$ and $FF\geq FF_1$ and wherein: FF is the residual power attenuation of the combined signal; DA, is the normalized residual amplitude dispersion; FF1 is a limit value of FF below which the bit error rate BER in the output signal of the demodulator depends predominantly on $DA^*$; $DA1^*$ is a limit value of $DA^*$ below which the bit error rate BER in the output signal of the demodulator depends predominantly on FF; a,b,c,d, m and q are coefficients such that the polynomial function $(OB(FF,DA^*))$ best approximates the logarithmic parametric representation of the bit error rate BER.

3. The signal combiner according to claim 1, wherein the normalized residual amplitude dispersion has the following expression:

$$DA^* = (N1 \times FN'/2 \times DA^2) + (N2 \times FN'/2 \times DA)$$

where DA and $DA^*$ are the measured residual amplitude dispersion and the normalized residual amplitude dispersion, respectively, FN' is the relative position of the notch frequency, and N1 and N2 are values taken experimentally.

4. The signal combiner according to claim 1, wherein the radio receivers each have a radio frequency amplifier, disposed at an input stage thereof, and wherein said digital signal processor has additional inputs, and including measuring means connected to said additional inputs of said digital signal processor for measuring a power of the intermediate frequency signals and supply the signals to said additional inputs of said digital signal processor for adaptively calculating additional control signals each controlling a gain of a respective one of the radio frequency amplifiers; and the additional control signals being such that when the residual amplitude dispersion is high, the additional control signals cause an increase in the gain of a radio frequency amplifier which receives a more attenuated signal, and thus facilitating a minimization of the polynomial function.

5. The signal combiner according to claim 1, wherein each of the radio receivers have a frequency conversion stage outputting the intermediate frequency signals, and including a phase shifter for mutual phase shifting of two local oscillator signals for the frequency conversion stages of the radio receivers.

* * * * *